UNITED STATES PATENT OFFICE.

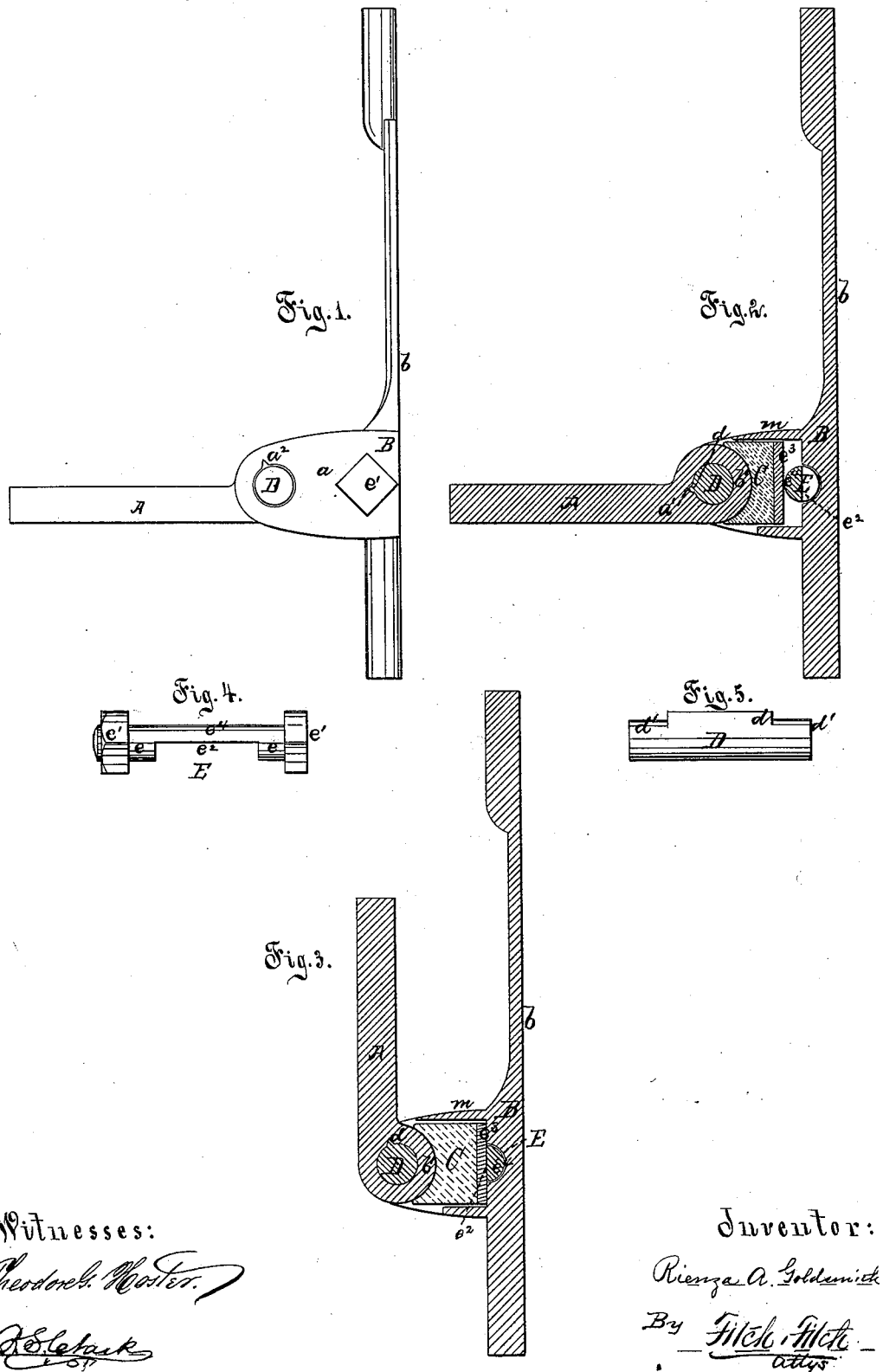

RIENZA A. GOLDSMITH, OF WASHINGTONVILLE, NEW YORK.

IMPROVEMENT IN THILL-COUPLINGS.

Specification forming part of Letters Patent No. 201,107, dated March 12, 1878; application filed August 1, 1877.

*To all whom it may concern:*

Be it known that I, RIENZA A. GOLDSMITH, of Washingtonville, Orange county, in the State of New York, am the inventor of an Improved Thill-Coupling, of which the following is a full, clear, and exact description, reference being had to the accompanying drawings, forming part of this specification.

My invention relates to a vehicle thill-coupling in which a block of india-rubber is employed to prevent the shaking and rattling of the parts; and my invention consists in the combination of parts hereinafter described, and more particularly recited in the claim.

Figure 1 is a side elevation of a thill-coupling embodying my invention. Fig. 2 is a vertical central sectional view of the same, showing the shaft down or extended and the parts in place for use. Fig. 3 is a similar view of the same, showing the shaft turned up and the parts in position for uncoupling; and Figs. 4 and 5 are views, in detail, of the cam or pressure shaft and the feathered pin, respectively, which I employ in connection with my other devices.

The object of my invention is to afford an inexpensive, convenient, and easily-manipulated means of securing the continuous action of the rubber block employed to prevent the shaking or rattling of the parts when the shaft is coupled, and of relieving the parts from the pressure of the said block when it is desired to couple or uncouple the shafts.

A is the shaft. B is the coupling on the axle, having strap $b$, by which it is secured to the axle in the usual manner. C is the rubber block, which is seated between the lugs or ears $a$ in the recess thus formed in the coupling. D is the bolt or pin, which may be employed to couple the shaft to the coupling. This is shown plainly in Fig. 5, and is formed with a rib, $d$, extending longitudinally along its central portion, leaving the wholly cylindrical ends or bearings $d'$.

In the opening in the shaft end through which this bolt is passed is formed a recess, $a^1$, extending longitudinally through the opening on the wall thereof, said recess being adapted to receive and fit upon the rib $d$ on the bolt D.

In one of the openings in the lugs or ears $a$, through which the bolt D is to be passed in coupling the shaft to the coupling, is formed a notch or recess, $a^2$, adapted to receive the rib $d$ and permit it to slide through.

In the rear or base of the recess in which is seated the rubber block C, I arrange a shaft, E, which is formed with the bearing ends $e$, having bearings in openings in the ears $a$ on either side, with nuts or heads $e^1$ on the exterior of the ears $a$, by which the shaft may be turned with a wrench. The office of this shaft is to compress the rubber C against the shaft end after the same is coupled to the coupling, and to release the same during the operation of coupling and uncoupling. This object may be conveniently accomplished by cutting away the shaft, as at $e^2$, Fig. 4, so that the body of the shaft at the portion exposed in the base or rear of the coupling is removed from its circumference to its axial line throughout its extent, and a plane surface thus formed at this part, the opposite portion of the shaft-body being curved or cylindrical in outline.

A metal plate, $e^3$, may be interposed between the shaft E and the rubber block in order to secure the equal compression of the rubber.

It is evident that, the shaft E being turned in its bearings so as to bring the curved or cylindrical portion $e^4$ of the shaft against the rubber, the rubber will be tightly compressed against the shaft end $b'$, and that, the said shaft E being turned so that the plane surface $e^2$ is exposed to the rubber, the rubber will be released from pressure. The shaft E may be given any desired or suitable conformation or structure to accomplish these results.

The operation of my coupling is as follows: To couple the shaft and coupling, the rubber C is released from pressure, as above described, and the shaft end is introduced between the ears $a$, and is coupled thereto by the bolt D or any other suitable coupling device. When the bolt D is employed the recess $a^1$ is brought to coincide with the notch $a^2$ in one of the ears $a$. The bolt D is now passed into the opening in the shaft end, the rib $d$ sliding through the notch $a^2$ into its seat in the recess $a^1$. It is desirable that the notch $a^2$ and recess $a^1$ should coincide when the shaft is turned up, as seen in Fig. 3. The shaft is now turned, preferably, to be turned down, as seen in Fig. 2, and the bolt D with its rib $d$ couples it securely, the said bolt being locked in place. The shaft E is now turned in its bearings so as to bring the cam $c^4$, or its equivalent, against the rear face of the rubber block, and thus compress the rubber against the shaft end $b'$.

The operation of uncoupling is evidently the reverse of the above.

At the point where the rubber bears against the shaft end $b'$ a metal facing of suitable form may be employed.

In constructing my coupling, I form a roof or lid, $m$, extending from one ear $a$ to the other laterally, and from the base of the coupling to a line with the joint of the shaft A with the coupling. The parts contained in the coupling are thus protected from the entrance of dirt and mud on the top, and the fouling or clogging of the parts from this cause thus prevented.

What I claim as my invention, and desire to secure by Letters Patent, is—

In combination, in a thill-coupling, the thill A, coupled to ears $a$ by a suitable bolt, the elastic block C, and the independent cam-shaft E, arranged to revolve in bearings in said ears at the rear of said elastic block, and to thus be operated to compress or release said block, as and for the purpose specified.

RIENZA A. GOLDSMITH.

Witnesses:
  A. S. FITCH,
  B. S. CLARK.